United States Patent
Butler

(10) Patent No.: US 6,251,308 B1
(45) Date of Patent: Jun. 26, 2001

(54) HIGHLY CONDUCTIVE MOLDING COMPOUNDS AND FUEL CELL BIPOLAR PLATES COMPRISING THESE COMPOUNDS

(75) Inventor: Kurt I. Butler, Kingsville, OH (US)

(73) Assignee: Premix, N. Kingsville, OH (US)

( * ) Notice: Subject to any disclaimer, the term of this patent is extended or adjusted under 35 U.S.C. 154(b) by 0 days.

(21) Appl. No.: 09/526,641

(22) Filed: Mar. 16, 2000

Related U.S. Application Data

(60) Provisional application No. 60/125,138, filed on Mar. 19, 1999.

(51) Int. Cl.$^7$ ............... H01B 1/20; H01B 1/21; H01B 1/22; H01M 8/00
(52) U.S. Cl. ............. 252/511; 252/512; 252/513; 264/104; 264/105; 429/30
(58) Field of Search ............... 252/511, 512, 252/513; 524/495; 528/86; 264/104, 105; 429/34

(56) References Cited

U.S. PATENT DOCUMENTS

| | | |
|---|---|---|
| 4,197,178 | 4/1980 | Pellegri et al. . |
| 4,301,222 | 11/1981 | Emanuelson et al. . |
| 4,339,322 | 7/1982 | Balko et al. . |
| 4,908,157 | 3/1990 | Fontana et al. . |
| 5,108,849 | 4/1992 | Watkins et al. . |
| 5,230,966 | 7/1993 | Voss et al. . |
| 5,250,228 | 10/1993 | Baigrie et al. . |
| 5,268,400 | 12/1993 | Iseler et al. . |
| 5,342,554 | 8/1994 | McBain et al. . |
| 5,516,546 | 5/1996 | Hari et al. . |
| 5,614,581 | 3/1997 | Cobbledick et al. . |
| 5,686,199 | 11/1997 | Cavalca et al. . |
| 5,744,816 | 4/1998 | Butler . |
| 5,854,317 | 12/1998 | Rinz . |
| 5,942,347 | 8/1999 | Koncar et al. . |
| 5,998,510 | 12/1999 | Butler . |
| 6,007,933 | 12/1999 | Jones . |

FOREIGN PATENT DOCUMENTS

WO 00/25372   8/1999   (WO) .

*Primary Examiner*—Mark Kopec
(74) *Attorney, Agent, or Firm*—Hudak & Shunk Co. LPA; Laura F. Shunk

(57) ABSTRACT

A conductive polymer is disclosed which is suitable for use in applications which require corrosion resistance including resistance to corrosion when subjected to acidic flow at temperature ranging from –40 to 140 degrees Fahrenheit and which can be molded into highly intricate and thin specimens which exhibit consistent conductivity, sufficient strength and flexibility, and appropriate surface characteristics. In particular the invention involves molding unsaturated prepolymer resin composition which have high loadings of conductive fillers. Further to enable the necessary characteristics, the compositions include rheological modifiers such as Group II oxides and hydroxides; carbodiamides; aziridines; polyisocyanates; polytetrafluoroethylene (PTFE); perfluoropolyether (PFPE), and polyethylene. Ostensibly, these modifiers act to alter the apparent molecular weight and three dimensional prepolymer network structures correcting rheological deficiencies which otherwise lead to excessive resin particulate separation during the molding process and large variances in bulk conductivity across the plate surface. The composition is disclosed for use in electrochemical cells, such as fuel cells.

51 Claims, 2 Drawing Sheets

HIGHLY CONDUCTIVE MOLDING COMPOUNDS AND FUEL CELL BIPOLAR PLATES COMPRISING THESE COMPOUNDS

This patent application is based upon U.S. provisional application Ser. No. 60/125,138, filed Mar. 19, 1999.

FIELD OF INVENTION

The field of invention is highly conductive compositions that are particularly useful for molding processes such as those using thermosetting bulk molding compositions. These molding compositions can be formed into high definition complex configurations. For example, they can be molded into thin plate-like specimens (e.g. 60 to 200 thousandths of an inch) having an intricately patterned network of very narrow, relatively smooth, flow passages. These specimens are used as electrochemical cell bipolar plates. These plates desirably have a bulk conductivity of at least 40, 50, 60, 70, 80, 90 or even 96 S/cm. They also have desirable surface characteristics; heat, temperature, chemical and shrink resistance; strength; and cost.

BACKGROUND OF THE INVENTION

Conductive polymers have applications in providing alternatives to traditional conductive materials, which often involve greater labor expenses to manufacture into complex parts. In particular, in instances where the demand justifies significant volumes of a product, polymer molding expenses may prove far more cost effective than comparable machining expenses for other materials. However in the past, it has proved difficult to achieve both a high level of conductivity and desirable molding characteristics. Generally, high level weight percentages of an appropriate filler in a polymeric matrix are necessary to achieve satisfactory levels of conductivity. However, these high load levels lead to problems with the strength, durability, and moldability of the resulting composition.

One area in particular where it would be beneficial to solve the previously mentioned strength, durability, and molding issues is for application in fuel cells. Electrochemical fuel cells have great appeal as a potentially limitless energy source that is clean and environmentally friendly. These fuel cells can, in addition, be constructed at an appropriate scale for small scale energy consumption, such as household use, or for industrial scale use, and even for commercial power generation. They have portable applications to power small appliances (such as computers or camping equipment), or automobiles and other forms of transportation. Although these different applications involve differences in size, the fundamental construction remains the same for generation of power varying from less than one to a few thousand kilowatts.

Basically, a fuel cell is a galvanic cell in which the chemical energy of a fuel is converted directly into electrical energy by means of an electrochemical process. The fundamental components of the fuel cell are an electrode comprising an anode and a cathode, eletrocatalysts, and an electrolyte. Work has been done in perfecting both liquid and solid electrolyte fuel cells and the present invention may find use in both types of fuel cells.

Solid electrolytes include polymeric membranes which act as proton exchange membranes typically fueled by hydrogen. These membranes usually comprise a perfluorinated sulphonic acid polymer membrane sandwiched between two catalyzed electrodes that may utilize platinum supported on carbon as an electrocatalyst. Hydrogen fuel cells form a reaction chamber, which consumes hydrogen at the anode. At the cathode, oxygen reacts with protons and electrons at the electrocatalytic sites yielding water as the reaction product. A three-phase interface is formed in the region of the electrode and a delicate balance must be maintained between the electrode, the electrolyte, and the gaseous phases.

Systems involving the use of other electrolytes have been also been studied. These would include alkaline fuel cells, phosphoric acid fuel cell, molten carbonate fuel cells, and solid oxide fuel cells. However, the principles are similar, as are some of the issues in perfecting these products.

A fuel cell reactor may comprise a single-cell or a multi-cell stack. In any case, the cell includes at least two highly conductive flow field plates that serve multiple functions. These plates may function as current collectors that provide electrical continuity between the fuel cell voltage terminals and electrodes. They also provide mechanical support (for example for the membrane/electrode assembly). In addition, these plates act to transport reactants to the electrodes and are essential to establishing the previously mentioned delicate phase balance.

Typically, the fuel cell plates are thin relatively flat plate members that include a highly complex network of interconnecting channels that form the flow field area of the plate. The configuration of these channels is highly developed in order to maintain the proper flow of reactants and to avoid channeling or the formation of stagnant areas, which results in poor fuel cell performance. It is critical that the flow of the reactants is properly managed, and that the electrocatalysts are continuously supplied with precisely the appropriate balance of reactants. Thus, it is essential for the plates to define and maintain clear passages within the highly engineered flow labyrinth. Moreover, in order to assure a satisfactory life, the plates must be able to resist surface corrosion under a variety of conditions. For example, fuel cells may be placed outside and subject to ambient weather. Thus, the cells must be resistant to stress cracking and corrosion at temperature ranging from −40 to 200 degrees Fahrenheit. Further, since the conditions within the cell are corrosive, the cells must also be resistant to chemical attack at these temperatures from various corrosive substances. For example, the plates may be subjected to de-ionized water, methanol, formic acid. formaldehyde, heavy naptha, hydrofluoric acid, tertafluoroethylene, and hexafluoropropylene depending on the fuel cell type. Moreover, the conditions within the fuel cell may lead to elevated temperatures, i.e. from 150 to 200 degrees Fahrenheit, as well as elevated pressures, i.e. from ambient to 30 p.s.i. Corrosive decomposition needs to be avoided since it almost certainly would cause a system failure by changing the flow patterns within the fuel cell.

Past attempts at solving the various requirements for fuel cell plates have included the use of metal and machined graphite plates. The use of metal plates result in higher weight per cell, higher machining costs and possibly corrosion problems. Machined graphite plates solve the weight and corrosion problems but involve high machining cost and result in fragile products, especially when prepared as very thin plates. Some use of graphite/poly(vinylidene fluoride) plates has been made but these have been characterized as being expensive and brittle and having long cycle times.

U.S. Pat. No. 4,197,178 is incorporated herein for its teaching of the working and compositions of electrochemical cells. U.S. Pat. No. 4,301,222 is incorporated herein for its teachings on graphite based separators for electrochemical cells.

SUMMARY OF THE INVENTION

In the past, known conventional bulk molding compounds have been modified to be conductive by the addition of large amounts of conductive filler, such as graphite. During molding it was observed that the liquid resin phase separated from the filler and was exuded from the molding. Further, it was observed that this occurrence tended to cause cracking in molded specimens that were thin. Moreover, bulk conductivity measurements at different locations within the specimen were inconsistent. In accordance with the present invention, it was discovered that compositions could be formulated which solved the foregoing issues. In particular, the formulations involve the use of a resin matrix with high loadings of a conductive filler; various additional additives, such as initiators, mold-release agents, and carbon black; and one or more rheological agents selected from the group comprising group II oxides, alkaline earth oxides, carbodiamides, polyisocynates, polyethylene and therefore polytetrafluorethylene flouroethylene. One possible explanation for the mechanism by which the molding agents work, is that they act to build the apparent molecular weight of the prepolymer (e.g. vinyl ester resin or unsaturated polyester resin). Alternatively, these agents may promote flow such as by reducing shear during molding. The use of these rheological agents eliminates phase separation, as well as cracking and inconsistent conductivity measurements. It is anticipated that these problems are a result of the complex configuration of the specimens being molded along with the very high concentrations of conductive filler.

In addition to solving molding and cracking problems it is anticipated that other properties such as the coefficient of thermal expansion, electrical and thermal conductivity, shrink resistance and mechanical properties may be more uniform and/or otherwise improved as a result of the use of the present invention. In addition to the foregoing improvements it was found that a resin composition of the invention demonstrated a higher glass transition temperature and resulted in an improvement in the hot strength of the molded part. Further improvements are also possible by optimizing both gel time and cure time for the prepolymer by controlling initiator type and amount and inhibitor type and amount.

The foregoing improvements in specimens molded from these compositions enable the low cost mass production of bipolar plates as an additional embodiment of the invention. These could be used for portable fuel cells, as well as stationary power units.

DETAILED DESCRIPTION OF THE INVENTION

Figure 1:
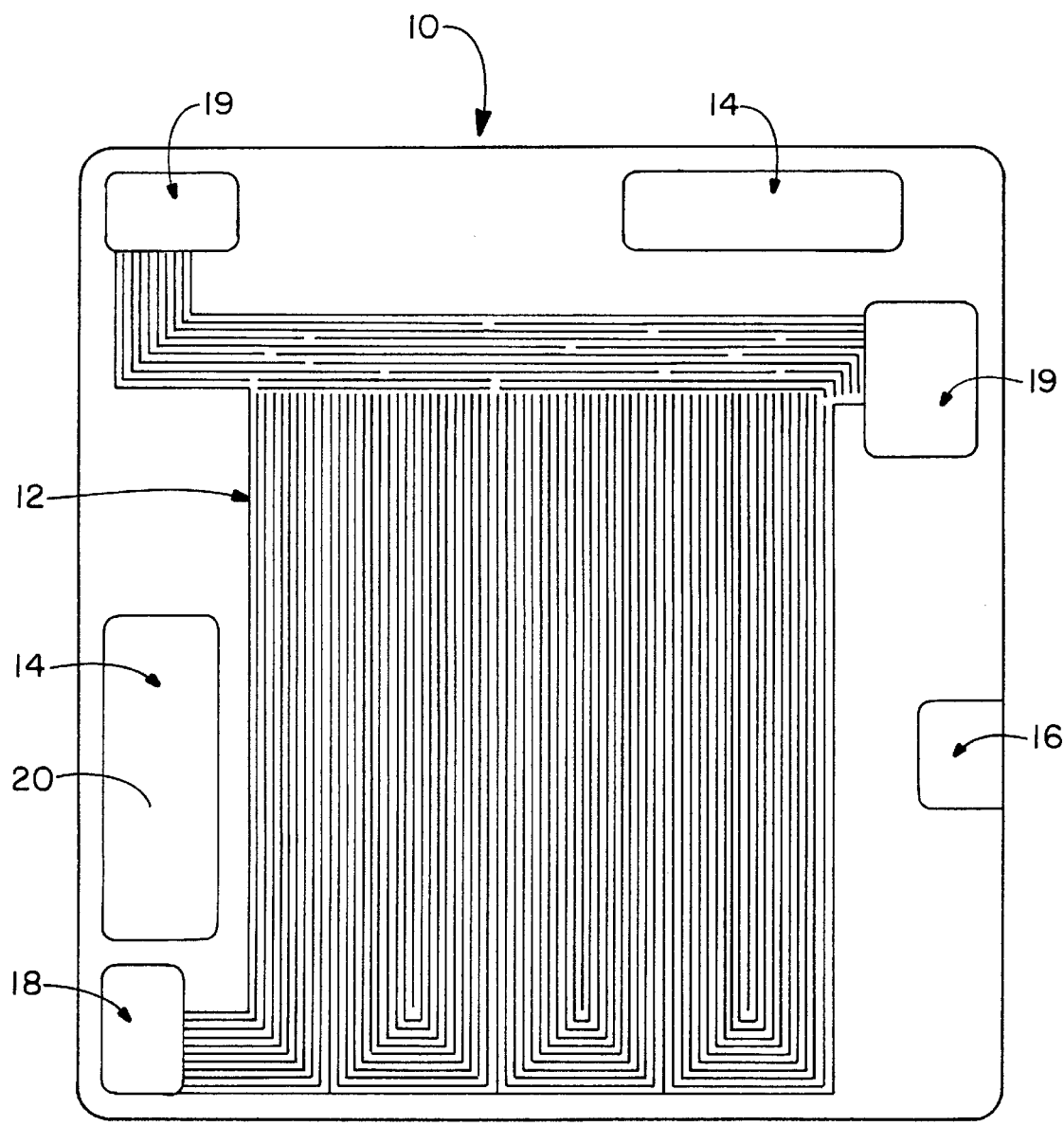
FIG. 1 is an illustration of a fuel cell assembly utilizing a bipolar cell plate.

The invention relates to improvements in conductive molding compositions. In particular, the compositions can be used in compression molding processes and in injection molding processes. Further these compositions enable the production of thin and intricate specimens that have high concentrations of conductive filler.

Sheet molding and bulk molding compositions are described in U.S. Pat. Nos. 5,998,510; 5,342,554; 5,854, 317; 5,744,816; and 5,268,400; all of which are hereby incorporated by reference for their teachings on the various modifications to molding compositions that are known to the art.

One component of a molding resin composition is a crosslinkable prepolymer such as an unsaturated polyester resin or vinyl ester resin. Desirably the prepolymer has a relatively low molecular weight such as from about 200 to about 5000 (weight average). They are described in detail with examples in the above patents incorporated by reference. The polyester resins are the condensation product derived from the condensation of unsaturated polybasic acids and/or anhydrides with polyols such as dihydroxy or trihydroxy compounds. Desirably, these polyester resins are the esterification reaction product of diacids, or anhydrides of diacids, generally having from about 3 to about 12, or more preferably from about 4 to about 8 carbon atoms, with a polyol or a cyclic ether having from about 2 to about 12, or more preferably from about 2 to about 6 carbon atoms.

In general, the vinyl ester resins that can be used are the reaction products of epoxy resins and a monofunctional ethlenically unsaturated carboxylic acid. More specifically, these vinyl ester resins are the reaction product of an epoxy terminated oligomer, for example, an epoxy functionalized bisphenol A with an acrylic acid, or methacrylic acid forming acrylic terminal groups on the oligomer. The vinyl esters have predominantly terminal unsaturation while the unsaturated polyesters have predominantly internal unsaturation.

Another component of the molding composition is one or more unsaturated monomers that are copolymerizable with the resin. Desirably, this component is cabable of dissolving the resin component at room temperature. Thus, in one embodiment the resin is dissolved in the monomeric component prior to being combined with the remaining components. Examples of suitable monomers are styrene, alpha-methyl styrene, chloro-styrene, vinyl toluene, divinyl benzene, diallylphthalate, methyl methacrylate, and mixture of these, with preferred monomers being styrene and methyl methacrylate. The ratio of monomer(s) to resin is desirably from about 40:60 to about 75:25 and preferably from about 40:60 to about 65:35 by weight.

Another component to the molding composition is fillers. In accordance with the invention the predominant filler is a conductive filler in order to impart electrical conductivity of the final molded product. A preferred filler is graphite particles, in particular, a synthetic crystalline graphite particle, such as currently supplied by Asbury Graphite in Asbury, N.J. under the designation Asbury 4012. This graphite is characterized as having less than 10% particles greater than 150 microns and less than 10% smaller than 44 microns in diameter. Other graphite fillers include: Ashbury A99, Ashbury 3243, Ashbury modified 4012, Ashbury 3285, Ashbury 230U; TimrexR KS 75 and 150, and TimrexR KC 44, all sold by TIMCAL of Westlake, Ohio; and Calgraph Sold by SGL Technic Inc of Valencia, Calif. This filler is used at a loading of at least 50% by weight. Other conductive fillers such as other forms of graphite (including graphite pitch-based fibers), metal particles, or metal coat particles may be used in conjunction with the graphite filler, or even alone. Desirably conductive fillers are at least about 50, about 60, or about 65 weight percent of the molding composition. More desirably the filler is more than about 70 or 71 percent to about 78 weight percent of the molding composition. Alternatively this amount can be expressed as at least about 250 phr, more preferably at least about 275, or even 300 phr. Alternatively stated the conductive fillers are present in an effective amount to result in a bulk conductivity of at least about 40, about 50, about 60, about 70, about 80, about 85, about 90 or about 96 S/cm when measured in accordance with ASTM Test Standard No. F1529-97 for a molded article having a thickness from about 0.060 to about 0.200 inches. Current technology in fuel cell plates uses a bulk conductivity of at least about 55, and preferably at least about 70.

An initiator is another component of the molding composition. The initiator initiates the copolymerization of the resin and the monomer(s). Initiators include any free radical initiator capable of forming radicals in the correct concentration under the molding conditions. They may include peroxides, hydroperoxides, redox systems, diazo compounds, persulfates, perbenzoates etc. The initiators are typically used in amounts of about 0.05 to about 5 weight percent, and more preferably about 0.1 to about 2 weight percent. Alternatively, these amounts can be expressed in parts per hundred parts by weight of resin, i.e. from about 0.5 to about 4.0 phr, preferably from about 0.7 to about 3.0 phr, and most preferably from about 0.8 to about 2.25 phr. Alternatively high temperature initiators such as Di-cup, e.g. dicumyl peroxide can be used for molding applications where higher iniation temperatures are desirable.

An essential component to the improved molding composition is a rheological modifier, which may act to increase the molecular weight such as by chain extension of the resin prepolymer. Suitable modifiers include Group II oxides and hydroxides, such as calcium or magnesium oxide; carbodiamides; aziridines; and polyisocyanates. It is believed that the foregoing modifiers act chemically by co-reacting into the polymer backbone at carboxy or hydroxy sites. Other suitable modifiers include therefore polytetrafluoroethylene (PTFE); perfluoropolyether (PFPE), and polyethylene. These modifiers may act to reduce shear and thus promote flow in the composition during molding. Fumed silica is an example of a substance which may act mechanically to increase molding viscosity and therefore be a suitable rheological modifier for this invention. Combinations of two or more rheological modifiers may be desirable for optimum properties. In this application they are used to modify the resin structure to prevent phase separation of the resin from the conductive filler (in particular in view of the high loadings of the conductive filler, i.e. over 50% or even 65% by weight or more of graphite) The modifiers are further used in general to enable the achievement of a high definition conductive polymeric fuel cell plate.

Desirably the rheological modifiers are used in an effective amount to prevent phase separation during molding. For the purpose of this application molding will desirably be at pressures from about 400 to about 5000 psi, and preferably from about 2000 to about 3500 psi, and most preferably from about 2500 to about 3000 psi. Desirable amounts of group II oxides (including group II hydroxides and mixtures of these compounds) is from about 0.1 to about 1 or about 2 weight percent, more desirably from about 0.2 or about 0.3 to about 0.7 or about 0.8 weight percent. This can also be expressed as from about 0.5 to about 4.0 phr, preferably from about 1.0 to about 3.0 phr, and most preferably from about 1.5 to about 2.5 phr. Specific preferred compounds include magnesium oxide, or magnesium hydroxide or calcium oxide. Examples of a suitable magnesium oxide additive is 99% pure magnesium oxide sold under the tradename "Elastomag" from Morton Thiokol, Inc. in Danvers, Mass. Other examples include a magnesium oxide dispersion sold under the tradename "pg-9033" by Plasticolors, and a magnesium hydroxide dispersion also sold by Plasticolors under the tradename "pg-91146". Another suitable magnesium hydroxide is Barcroft which is a powdered version. Examples of aziridine compounds include polyfunctional aziridines supplied by EIT,lnc. under the trade designation XAMA, including XAMA-2, which is identified as trimethylol propane-tris (beta-(N-aziridinyl) proprionate), and, in particular, XAMA-7, which is identified as pentaerythritol-tris-(beta-(aziridinyl) proprionate); a product of Sybron Chemicals, under the tradeneme lonac including PFAZ-322, identified as a trifunctional aziridine; and including CX-100, a product of Zeneca Resins, identified as a polyfunctional aziridine. Desirable amounts of aziridine and/or polyisocyanate modifiers is from about 1 to about 10 or about 15 weight percent, and more desirably from about 2 or about 3 to about 8 or about 9 weight percent. This can also be expressed as from about 0.5 to about 20 phr, preferably from about 1 to about 17 phr, and most preferably from about 2 to about 15 phr. Polyisocyanates in general are described in more detail in U.S. Pat. No. 5,268,400 column 6, line 59 through column 7, line 17. A specific diisocyanate which can be used is diphenylmethane diisocyanate such as that sold by ICI Americas of West Deptford, N.J., under the tradename "Rubinate" R MF-1780. Additionally, a suitable diisocynate is Lupranate MP102, solvent free urethane-modified diphenylmethane diisocyanate from BASF. Desirable amounts of polytetraflooroethylene (PTFE) (and/or perfluoropolyether (PFPE)) is from about 0.5 to about 1 or about 2 weight percent, more desirably from about 0.6 or about 0.7 to about 1.8 or about 1.3 weight percent. This can also be expressed as from about 0.5 to about 20 phr, preferably from about 3 to about 15 phr, and most preferably from about 5 to about 12 phr. A suitable fine particle PTFE powder (having an average particle size by Coulter Counter of less than-microns) is sold under the tradename "Marzon #5 by Marshall Products Company of West Chester Pa. It is preferable to use a linear low density polyethylene such as sold by Equistar of Houston Tex. under the tradename FN 510 It is preferable to use it in amounts of from about 3 to about 20 phr, more preferably from about 4 to about 17, and most preferably from about 5 to about 15 phr. Fumed silica could be used at from about 0.5 to about 20 phr, preferably from about 1 to 10 phr.

Other optional components to a molding composition include urethane based or urethane containing oligomers or polymers, low shrinkage additives like polyvinyl acetate or polyethylene; fibrous reinforcing agents such as cotton glass microfibers or graphite microfibers; flexibilizing agents; mold release agents; polymerization inhibitors to inhibit premature polymerization during storage or the initial stages of molding; viscosity modifiers like fumed silica; and mold lubricant like stearates of calcium, zinc or magnesium. Carbon black may be added to influence the surface conductivity and to change the appearance of the molded product. Suitable carbon blacks include an electrically conductive low residue carbon black having a nitrogen surface area m2/g of 270, a STSA surface Area m2/g of 145 a sieve residue at 35 mesh of 0 ppm and at 325 mesh of 20 ppm as sold under the tradename Conductex 975 by Columbia Chemicals of Jamesburg, N.J. Also, suitable conductive carbon black is supplied by Akzo Nobel Chemicals of Chicago, Ill. under the tradename Ketjenblack EC-300 J and EC-600JD. Cabot Corporation of Boston Mass. also supplies a conductive carbon black. It is noted that polyethylene and fumed silica can function as the rheological modifier in addition to the foregoing functions.

The molding compositions may be formulated and mixed using a variety of mixing conditions including either continuous or batch and using a variety of known mixing equipment. Specific examples are set forth in the example section. The compositions may be advantageously stored for reasonable times before molding. The compositions can be molded by a variety of methods including compression molding and injection molding. The compositions can be molded under typical conditions for these types of molding including at pressures from about 400 to about 5000 psi, and preferably from about 2000 to about 3500 psi, and most preferably from about 2500 to about 3000 psi and temperatures at from about 225 to about 400 degrees Fahrenheit. Dwell times are from about 70 seconds to about four minutes. The compositions are useful for molding complex configurations including thin or intricate conductive articles such as those having a thickness from about 0.050 to about 0.200 inches, and more preferably from about 0.060 to about 0.150 inches. The compositions are useful for articles having bulk conductivity of at least 40, 50, 60, 70, 80, 85, 90 or even 96 S/cm at a thickness given above. The articles from the composition desirably have tensile strength from about 1500 to about 5000 psi as measured in accordance with ASTM test No.D638 and flexural modulus from about 2500 to about 10,000 psi when tested in accordance with ASTM test No.D790.

Molded products made from the compositions of the present invention are useful for a variety of applications demanding complex configurations, conductivity, as well as strength, and corrosion resistance. One particularly advantageous product which can be made by compression molding is a bipolar plate for use in fuel cells. An example of such a plate is shown in FIG. 1. The drawing of this plate is intended to illustrate the molding capabilities of the conductive compound of the present invention. It is not necessarily intended to provide optimal, or even operative, field flow design. It should not limit the invention in any way. The plate 10 includes a fluid flow face with one or more generally parallel and or serpentine flow channels 12. The flow channels receive and transmit fluids through ports 14 and 16 which are in fluid communication with corresponding entry and exit fluid manifolds 18 and 19. The plate has a dimension which will vary from 1 to 20 inches in length and width, and having a thickness of 0.02 to 0.3 inch, with a cross-sectional depth of the flow channel in the range of about 0.005 to 0.080 inch. The cross-sectional width of a land separating adjacent flow channel sections is in the range of 0.01 to 0.1 inch. The plate may include a number of peripheral through holes 20 that act as a manifold for fuel transportation.

Figure 2:
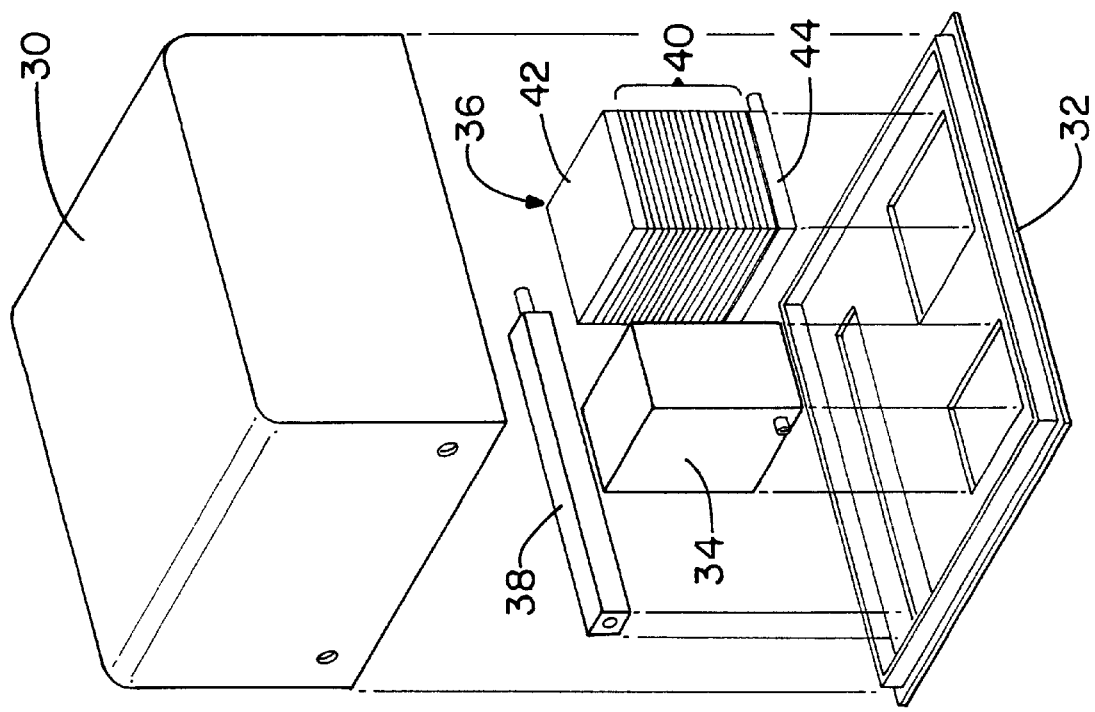
FIG. 2 is an illustration of a bipolar fuel cell plate that can be made in accordance with the present invention.

FIG. 2 illustrates the unassembled components of a fuel cell. This fuel cell has a base unit 12 which includes debossed means to accept a reformer 14 and a fuel cell stack 16 which is comprised of a plurality of bipolar plates 20 which are sandwiched between a stack cap 22 and a stack base 24. The fuel cell further includes a heat exchanger 26. An enclosure 30 provides a leak-proof housing for the unit.

EXAMPLES

The following examples use the components set forth below.

Resin A is Hetron 922 available from Ashland Chemical Co in Columbus Ohio. It is a low viscosity epoxy vinyl ester resin. It is about 55 wt. % solids and about 45 wt. % reactive monomer.

Resin B is Atlac 382ES from Reichhold Chemicals, Inc. in Research Triangle Park, N.C. It is characterized as a bisphenol fumarate resin. It was diluted to about 55 wt. % solids with styrene.

Resin C is Dion 6694 diluted to 55 wt. % solids in styrene. It is available from Reichhold Chemicals, Inc. It is characterized as a modified bisphenol fumarate polyester.

Resin D is 42-2641 from Cook Composites and Polymers in Kansas City, Mo. It was diluted to 55 wt. % solids with styrene. It is characterized as an unsaturated polyester resin.

Resin E is ATLAC 3581-61 from Reichhold Chemicals, Inc. It is characterized as a vinyl ester resin at 19 wt %, polyester at 27 wt % and urethane polymer at 4 wt % combined with 50 wt % styrene. Thus, it was diluted to 50 wt % solids with styrene.

Resin F is 580-05 from Reichhold Chemicals, Inc. It is characterized as a urethane-modified vinyl ester resin. It was diluted to 54 wt % solids with styrene.

Resin G is 9100 from Reichhold Chemicals, Inc. It is characterized as a bisphenol-epoxy vinyl ester. It was diluted to 54–58 wt % solids with styrene.

Resin H is Dow Derakane R8084 from Dow Chemicals, Inc. It is characterized as an elastomer-modified vinyl ester resin. It was diluted to 50–60 wt % solids with styrene.

Resin I is 9480-00 from Reichhold Chemicals, Inc. It is characterized as an epoxy novolac vinyl ester. It was diluted to 53.5 wt % solids with styrene.

Resin J is Atlac 31-632 from Reichhold Chemicals, Inc. It is an unsaturated isocyanurate vinyl ester resin.

Rheological Modifier A is Elastomag from Morton Thiokol. Inc. in Danvers, Mass. It is characterized as 99% pure magnesium oxide.

Rheological Modifier B is a polyisocyanate. The material used in these experiments is 40-7263 from Cook Composites and Polymers. It is characterized by a NCO content of 17.7 to 20.9, a viscosity of 110–170, a flash point of 87° F., and a crystallization point of 40° F.

Rheological Modifier C is RCI RD THL55 (also known as RD-1070) from Reichhold, Inc. It is specifically a polyurethane resin.

Rheological Modifier D is Rubinate 1780 available from ICI. It is characterized as a polymeric methylene diphenyl diisocyanate.

Rheological Modifier E is Marzon #5 from Marshall Products Company of West Chester, Pa. It is characterized as a finely divided powder polytetrafluorethylene.

Rheological Modifier F is FN-510, a linear low density polyethylene

Initiator A is Vazo (2,2-azo bisisobutyronitrile) available from Dupont, I & B Industrial and Biochemical Dept, Wilmington Del.

Initiator B is tert-butyl peroxy isopropyl carbonate (Triginox BPIC) available from Durr Marketing in Pittsburgh, Pa.

Initiator C is t-butylperbenzoate (TBPB) available from Durr Marketing.

Initiator D is 1,3 di-t-butyl peroxy-3,5,5 trimethylcyclohexane catalyst (Trig 29B75) available from Durr Marketing.

The mold release agent is calcium stearate.

Graphite A is a synthetic, crystalline graphite available from Asbury Graphite in Asbury, N.J. It is characterized by having less than 10% greater than 150 microns and less than 10% smaller than 44 microns in diameter. It is available under the designation 4012.

Graphite B is a very fine conductive particulate graphite available from SGL Technic of Valencia, Calif. under the trade designation SGL 02.

Graphite C is a conductive particulate graphite available from SGL Technic of Valencia Calif. under the trade designation SGLVFINE.

Graphite D is available from Asbury Graphite in Asbury, N.J. It is a modified version of the 4012 product.

Graphite E is a conductive flake graphite available from Asbury Graphite in Asbury, N.J. under the trade designation 3243. It is characterized by having less than 18% greater than 75 microns and less than 65% smaller than 44 microns in diameter.

Graphite F is a conductive flake graphite available from Asbury Graphite in Asbury, N.J. under the trade designation 230U. It is characterized by having 100% smaller than 44 microns in diameter.

Graphite G is a synthetic graphite available from Asbury Graphite in Asbury, N.J. under the trade designation A99. It is characterized by having less than 3% greater than 44 microns and less than 99% smaller than 44 microns in diameter.

Graphite H is a synthetic graphite available under the designation KS 75, from Timrex America, Inc. It is characterized by having less than 95% greater than 96 microns and less than 95% smaller than 75 microns in diameter.

Graphite I is a synthetic graphite available under the designation KS 150, from Timrex America, Inc. It is characterized by having at least 95% less than 180 microns in diameter Graphite J is a synthetic graphite available under the designation KC44, from Timrex America, Inc. It is characterized by having at least 90% less than 48 microns in diameter.

Carbon Black B is characterized as an electrically conductive low residue carbon black having a nitrogen surface area m2/g of 270, a STSA surface Area m2/g of 145 a sieve residue at 35 mesh of 0 ppm and at 325 mesh of 20 ppm as sold under the tradename Conductex 975 by Columbia Chemicals of Jamesburg, N.J.

Carbon Black C is conductive carbon black supplied by Cabot Corporation of Boston, Mass. under the tradename, Black Pearls, while Graphite D supplied by this company under the designation XC-72.

Carbon Black E is conductive carbon black is supplied by Akzo Nobel Chemicals of Chicago, Ill. under the tradename Ketjenblack EC-300 J and EC-600JD. EC-300 J has an iodine absorption of 740–840 mg/g; a pore volume of 310–345 cm3/100 g and an apparent bulk density of 125–145 kg/m3. EC-600 JD has an iodine absorption of 1000–1150 mg/g; a pore volume of 480–510 cm3/100 g and an apparent bulk density of 100–120 kg/m3.

The Glass fibers were from Owens-Corning Fiberglass and are characterized as continuous glass filaments hammermilled into a specific length used as a reinforcing and filler medium.

The inhibitor was 2,6-di-tertbutyl-p-cresol (25% in vinyl toluene).

The molding compositions are generally prepared by adding the resin, monomer initiator, inhibitor, mold release agent, and rheological modifier (if present) to a high shear cowels disperser and blending for 2 minutes. The conductive filler is added to the mix in a Baker Perkin Mixer and mixed 15 minutes. When mixing is complete the composition is put in a suitable barrier bag and allowed to mature for approximately one day before molding.

The molding parameters for the molding compositions are as follows: Molding temperature for plaques was 295° F. with a molding time of 3 minutes and a charge weight of 173 g. The molding temperature for prototype bipolar plates was 290° F. with a molding time of 3 minutes and a charge weight of 300 g. It was observed that the use of specific thermosetting resins with a conductive filler in combination with various rheological additives (thickeners) improved the bipolar plate composition in regards to having a product which can be used in mass production of electrochemical, e.g. fuel, cell bipolar plates.

The results of the formulation changes include non-cracking molding compound, better hot strength out of the mold, lower production costs, shorter cycle times, better overall electrical conductivity, increased mechanical properties, and better rheological characteristics.

In Table IA the Control L-23012 suffered from cracking during molding of a plate and had non-uniform conductivity and resistivity along the surface of the plate due to phase separation of the conductive filler and resin during molding. Samples L-23185, L-23120, L-23119 and L-23126 had desirable properties.

In Table IB Samples L-23125, L-23186, L-23039 had desirable properties. Samples L-23184 and L-23022 had lower than optimal bulk conductivity and higher than optimal resistivity.

In Table IC Samples L-23023, L-23063, L-23024, L-323027, and L-23026 had lower than optimal bulk conductivity and higher than optimal resistivity.

In Table ID Samples L-23209 and L-23215 had good properties. Samples L-23028, L-23210, and L-23211 had lower than optimal bulk conductivity and higher than optimal resistively.

TABLE IA

| Component | Control L-23012 | L-23185 | L-23120 | L-23119 | L-23126 |
|---|---|---|---|---|---|
| Resin A | 30.1 g | | | | |
| Resin B | | | | | |
| Resin C | | | | 19.95 g | |
| Resin D | | 17.13 | 15.63 | | 23.33 |
| Initiator | 0.6 g (A) | 0.4 (B) | 0.4 (B) | 0.4 (B) | 0.4 (B) |
| Inhibitor | 0.1 | 0.1 | 0.1 | 0.1 | 0.1 |
| Mold Release | 1.2 | 1.2 | 1.2 | 1.2 | 1.2 |
| Graphite A | 68 g | 75 | 78 | 78 | |
| Graphite B | | | | | 68 |
| Graphite C | | | | | |
| Modifier A | — | | | 0.35 g | |
| Modifier B | — | 6.17 | 4.67 | | 6.97 |
| Glass fibers | | | | | |
| Bulk Conductivity S/cm | 85 | 85 | 90 | 90 | 70 |
| Areal Conductivity S/cm$^2$ | 300 | 260 | 260 | 260 | 220 |
| Tensile psi | 3500 | 3700 | 3600 | 3100 | 3500 |
| Flexural psi | 4100 | 5500 | 4300 | 3500 | 4200 |
| Resistivity OHMS/M$^2$ | | 70.9 | 87.51 | 71.2 | 37.7 |

TABLE IB

| Component | L-23125 | L-23186 | L-23039 | L-23184 | L-23022 |
|---|---|---|---|---|---|
| Resin A | | | | | |
| Resin B | | | 19.95 | | 29.95 |
| Resin C | | 22.65 | | 27.65 | |
| Resin D | 23.33 g | | | | |
| Initiator | 04 (B) | 0.4 (C) | 0.4 (B) | 0.4 (C) | 0.4 (B) |
| Inhibitor | 0.1 | 0.1 | 0.1 | 0.1 | 0.1 |
| Mold Release | 1.2 | 1.3 | 1.2 | 1.3 | 1.2 |
| Graphite A | 34 | 70 | 68 | 70 | 68 |
| Graphite B | 34 | | | | |
| Graphite C | | | | | |

TABLE IB-continued

| Component | L-23125 | L-23186 | L-23039 | L-23184 | L-23022 |
|---|---|---|---|---|---|
| Modifier A | | 0.55 | 0.35 | 0.55 | 0.35 |
| Modifier B | 6.97 | | | | |
| Glass fibers | | 5 | | 10 | |
| Bulk Conductivity S/cm | 70 | 70 | 65 | 45 | 40 |
| Areal Conductivity S/cm$^2$ | 210 | 210 | 200 | 140 | 140 |
| Tensile psi | 3400 | 3000 | 2800 | 3000 | 4100 |
| Flexural psi | 4200 | 3700 | 3800 | 4000 | 5000 |
| Resistivity OHMS/M$^2$ | 58.13 | 123.8 | 117.6 | 155.6 | 222.1 |

TABLE IC

| Component | L-23023 | L-23063 | L-23024 | L-23027 | L-23026 |
|---|---|---|---|---|---|
| Resin A | | | | | |
| Resin B | 29.95 | 29.95 | 29.95 | | |
| Resin C | | | | 29.95 | 29.950 |
| Resin D | | | | | |
| Initiator | 0.4 (C) | 0.4 (B) | 0.4 (D) | 0.4 (C) | 0.4 (B) |
| Inhibitor | 0.1 | 0.1 | 0.1 | 0.1 | 0.1 |
| Mold Release | 1.2 | 1.2 | 1.2 | 1.2 | 1.2 |
| Graphite A | 68 | 68 | 68 | 68 | 68 |
| Graphite B | | | | | |
| Graphite C | | | | | |
| Modifier A | 0.35 | 0.35 | 0.35 | 0.35 | 0.35 |
| Modifier B | | | | | |
| Glass fibers | | | | | |
| Bulk Conductivity S/cm | 40 | 40 | 35 | 30 | 30 |
| Areal Conductivity S/cm$^2$ | 140 | 120 | 130 | 90 | 90 |
| Tensile psi | 4200 | 3500 | 3100 | 4700 | 4300 |
| Flexural psi | 4900 | 4200 | 3400 | 6000 | 5300 |
| Resistivity OHMS/M$^2$ | 205.9 | — | 181.7 | 320.9 | 246.8 |

TABLE 1D

| Component | L-23028 | L-23209 | L-23210 | L-23211 | L-23215 |
|---|---|---|---|---|---|
| Resin A | | | | | |
| Resin B | | | | | |
| Resin C | 29.95 | | | 28.65 | 22.65 |
| Resin D | | 21.49 | 21.49 | | |
| Initiator | 0.4 (D) | 0.4 (B) | 0.4 (B0 | 0.4 (B) | 0.4 (B) |
| Inhibitor | 0.1 | 0.1 | 0.1 | 0.1 | 0.1 |
| Mold Release | 1.2 | 1.2 | 1.2 | 1.3 | 1.3 |
| Graphite A | 68 | 42 | 42 | 43 | 70 |
| Graphite B | | 26 | | | |
| Graphite C | 0.35 | | 26 | 26 | |
| Modifier A | 0.35 | | | 0.55 | 0.55 |
| Modifier B | | 8.81 | 8.81 | | |
| Glass fibers | | | | | |
| Bulk Conductivity S/cm | 30 | 77 | 25 | 45 | 79 |
| Areal Conductivity S/cm$^2$ | 100 | 227 | 74 | 132 | 233 |
| Tensile psi | 3800 | 2700 | 3900 | 3000 | 2600 |
| Flexural psi | 5100 | 3900 | 5500 | 4500 | 4300 |
| Resistivity OHMS/M$^2$ | 220.9 | 62.02 | 377.8 | 186.46 | 102.74 |

TABLE 2A

| Component | 23012 | 23039 | 23022 | 23023 | 23063 |
|---|---|---|---|---|---|
| Resin A | 100 | | | | |
| Resin B | | 100 | 100 | 100 | 100 |
| Initiator A | 1.99 | | | | |
| Initiator B | | 2.01 | 1.34 | | 1.34 |
| Initiator C | | | | 1.34 | |
| Inhibitor | 0.33 | 0.50 | 0.33 | 0.33 | 0.33 |
| Release Agent | 3.99 | 6.02 | 4.01 | 4.01 | 4.01 |
| Graphite A | 225.91 | 340.85 | 227.05 | 227.05 | 227.05 |
| Modifier A | | | 1.17 | 1.17 | 1.17 |
| Fiber A | | 50.13 | | | |
| Bulk Conductivity S/cm | 85 | 65 | 40 | 40 | 40 |
| Areal Conductivity S/cm$^2$ | 300 | 200 | 140 | 140 | 120 |
| Tensile psi | 3500 | 2800 | 4100 | 4200 | 3500 |
| Flexural psi | 4100 | 3800 | 5000 | 4900 | 4200 |

TABLE 2B

| Component | 23024 | 23119 | 23186 | 23184 | 23027 |
|---|---|---|---|---|---|
| Resin B | 100 | | | | |
| Resin C | | 100 | 100 | 100 | 100 |
| Initiator B | | 2.01 | | | |
| Initiator C | | | 1.77 | 1.45 | 1.34 |
| Initiator D | 1.34 | | | | |
| Inhibitor | 0.33 | 0.50 | 0.44 | 0.36 | 0.33 |
| Release Agent | 4.01 | 6.02 | 5.74 | 4.70 | 4.01 |
| Graphite A | 227.05 | 390.98 | 309.05 | 253.16 | 227.05 |
| Modifier A | 1.17 | 1.75 | 2.43 | 1.99 | 1.17 |
| Fibers A | | | 22.08 | | |
| Bulk Conductivity S/cm | 35 | 90 | 70 | 45 | 30 |
| Areal Conductivity S/cm$^2$ | 130 | 260 | 210 | 140 | 90 |
| Tensile psi | 135 | 260 | 210 | 140 | 90 |
| Flexural psi | 3100 | 3100 | 3000 | 3000 | 4700 |

TABLE 2C

| Component | 23026 | 23028 | 23211 | 23215 | 23185 |
|---|---|---|---|---|---|
| Resin C | 100 | 100 | 100 | 100 | |
| Resin D | | | | | 100 |
| Initiator B | 1.34 | | 1.40 | 1.77 | 234 |
| Initiator D | | 1.34 | | | |
| Inhibitor | 0.33 | 0.33 | 0.35 | 0.44 | 0.58 |
| Release Agent | 4.01 | 4.01 | 4.54 | 5.74 | 7.01 |
| Graphite A | 227.05 | 227.05 | 150.09 | 309.05 | 437.83 |
| Graphite C | | | 90.75 | | |
| Modifier A | 1.17 | 1.17 | 1.92 | 2.43 | |
| Modifier B | | | | | 36.02 |
| Fiber B | | | | 22.08 | |
| Bulk Conductivity S/cm | 30 | 30 | 45 | 79 | 85 |
| Areal Conductivity S/cm$^2$ | 90 | 100 | 132 | 233 | 260 |
| Tensile psi | 4300 | 3800 | 3000 | 2600 | 3700 |
| Flexural psi | 5300 | 5100 | 4500 | 4300 | 5500 |

TABLE 2D

| Component | 23120 | 23126 | 23125 | 23209 | 23210 |
|---|---|---|---|---|---|
| Resin D | 100 | 100 | 100 | 100 | 100 |
| Initiator B | 2.56 | 1.71 | 1.71 | 1.86 | 1.86 |
| Inhibitor | 0.64 | 0.43 | 0.43 | 0.43 | 0.47 |
| Release Agent | 7.68 | 5.14 | 5.14 | 5.58 | 5.58 |
| Graphite A | 499.04 | | 145.74 | 195.44 | 195.44 |
| Graphite B | | 291.47 | 145.74 | 120.99 | |
| Graphite C | | | | | 120.99 |
| Modifier B | 29.88 | 29.88 | 29.88 | 41.00 | 41.00 |
| Bulk Conductivity S/cm | 90 | 70 | 70 | 77 | 25 |
| Areal Conductivity S/cm$^2$ | 260 | 220 | 210 | 227 | 74 |
| Tensile psi | 3600 | 3500 | 3400 | 2700 | 3900 |
| Flexural psi | 4300 | 4200 | 4200 | 3900 | 5500 |

TABLE 3A

| Component | 23227 | 23236 | 23237 | 23274 | 23275 |
|---|---|---|---|---|---|
| Resin D | 100 | 100 | 100 | 100 | 100 |
| Initiator B | 1.56 | 1.44 | 1.51 | 2.34 | 2.34 |
| Inhibitor | 0.52 | 0.48 | 0.50 | 0.58 | 0.58 |
| Release Agent | 6.24 | 5.77 | 6.06 | 7.01 | 7.01 |
| Graphite A | 390.02 | 350.96 | 368.50 | 420.32 | 420.32 |
| Carbon A | | | | 17.51 | |
| Modifier B | 21.68 | 22.12 | 28.22 | 36.02 | 36.02 |
| Fiber C | | | | | 11.68 |
| Bulk Conductivity S/cm | 90 | | | | |
| Tensile psi | 2672 | | | | |
| Flexural psi | 6543 | | | | |
| Density g/cm3 | | 1.67 | 1.75 | 1.77 | |
| Shrink mils/in | | −1.5 | −1.83 | −2.25 | |

TABLE 3B

| Component | 23292 | 23293 | 23343 | 23344 | 23345 |
|---|---|---|---|---|---|
| Resin D | 100 | 100 | 100 | 100 | 100 |
| Initiator B | 1.48 | 1.56 | 1.44 | 1.29 | 1.20 |
| Inhibitor | 0.49 | 0.52 | 0.48 | 0.43 | 0.40 |
| Release Agent | 5.93 | 6.24 | 5.75 | 5.14 | 4.80 |
| Graphite A | 370.74 | 395.22 | 349.78 | 299.91 | 272.22 |
| Modifier B | 15.67 | 16.48 | 21.71 | 21.68 | 21.70 |
| Bulk Conductivity S/cm | | | | 72.5 | 58 |
| Tensile psi | | 2170 | 2547 | 2448 | 2679 |
| Flexural psi | | 4616 | 6503 | 5423 | 5897 |
| Density g/cm3 | 1.67 | 1.73 | 1.71 | | |
| Shrink mils/in | −2.17 | −2.08 | −2 | | |

TABLE 3C

| Component | 23346 | 23347 | 23348 | 23349 | 23350 |
|---|---|---|---|---|---|
| Resin D | 100 | 100 | 100 | 100 | 100 |
| Initiator B | 1.09 | 1.03 | 0.95 | 0.90 | 0.84 |
| Inhibitor | 0.36 | 0.34 | 0.32 | 0.30 | 0.28 |
| Release Agent | 4.37 | 4.13 | 3.80 | 3.61 | 3.36 |
| Graphite A | 236.79 | 216.57 | 190.11 | 174.70 | 154.19 |
| Modifier B | 21.68 | 21.69 | 21.67 | 21.69 | 21.67 |
| Tensile psi | 3083 | 3053 | 2923 | 3107 | 3470 |
| Flexural psi | 5715 | 5766 | 5666 | 5398 | 5378 |
| Density g/cm3 | 1.75 | 1.71 | 1.73 | 1.7 | 1.64 |
| Shrink mils/in | −3 | −3.5 | −3.33 | −4 | −5 |

TABLE 3D

| Component | 23351 | 23352 | 23360 | 23361 | 23362 |
|---|---|---|---|---|---|
| Resin D | 100 | 100 | 100 | 100 | 100 |
| Initiator B | 0.80 | 0.75 | 2.27 | 2.21 | 2.14 |
| Inhibitor | 0.27 | 0.25 | 0.57 | 0.55 | 0.54 |
| Release Agent | 3.22 | 3.02 | 6.81 | 6.62 | 6.43 |
| Graphite A | 142.05 | 125.75 | 425.41 | 413.45 | 402.14 |
| Modifier B | 21.68 | 21.73 | 32.16 | 28.45 | 24.93 |
| Bulk Conductivity S/cm | | | | | 85.5 |
| Tensile psi | 2787 | 2629 | | | 2155 |
| Flexural psi | 6167 | 5998 | | | 6017 |
| Density g/cm3 | 1.72 | 1.71 | 1.65 | 1.73 | 1.68 |
| Shrink mils/in | −1.67 | −1.83 | −1.42 | −1.42 | −0.67 |

TABLE 4A

| Component | 23364 | 23365 | 23366 | 23367 | 23368 |
|---|---|---|---|---|---|
| Resin D | 100 | 100 | 100 | 100 | 100 |
| Monomer A | 9.72 | 8.18 | 7.05 | 6.20 | 5.53 |
| Initiator B | 1.46 | 1.23 | 1.06 | 0.93 | 0.83 |
| Inhibitor | 0.49 | 0.41 | 0.35 | 0.31 | 0.28 |
| Release Agent | 5.83 | 4.91 | 4.23 | 3.72 | 3.32 |
| Graphite A | 340.30 | 265.85 | 211.57 | 170.54 | 138.31 |
| Modifier B | 28.43 | 28.34 | 28.35 | 28.37 | 28.35 |
| Bulk Conductivity S/cm | 55.99 | 36.57 | 32.86 | 18.37 | 13.59 |
| Tensile psi | 2647 | 2697 | 2701 | 2880 | 2992 |
| Flexural psi | 6044 | 6131 | 6149 | 7002 | 7338 |
| Density g/cm3 | 1.75 | 1.74 | 1.71 | 1.72 | 1.71 |
| Shrink mils/in | −2.5 | −2.83 | −3.17 | −3.33 | −3.83 |

TABLE 4B

| Component | 23369 | 23370 | 23371 | 23372 | 23373 |
|---|---|---|---|---|---|
| Resin D | 100 | 100 | 100 | 100 | 100 |
| Initiator B | 1.36 | 1.15 | 1.00 | 0.89 | 0.79 |
| Inhibitor | 0.45 | 0.38 | 0.33 | 0.30 | 0.26 |
| Release Agent | 5.42 | 4.61 | 4.01 | 3.55 | 3.18 |
| Graphite A | 316.17 | 249.52 | 200.33 | 162.48 | 132.45 |
| Modifier B | 28.27 | 28.21 | 28.21 | 28.21 | 28.21 |
| Bulk Conductivity S/cm | 49.49 | 27.74 | 25.05 | 14.01 | 8.12 |
| Tensile psi | 2974 | 3358 | 3014 | 2952 | 3154 |
| Flexural psi | 6394 | 6099 | 6520 | 6312 | 6071 |
| Density | 1.72 | 1.76 | 1.69 | 1.73 | 1.72 |

TABLE 4B-continued

| Component | 23369 | 23370 | 23371 | 23372 | 23373 |
|---|---|---|---|---|---|
| g/cm3 | | | | | |
| Shrink mils/in | −3.5 | −2.5 | −2.83 | −3.17 | −3.53 |

TABLE 4C

| Component | 23443 | 23444 | 23445 | 23466 | 23467 |
|---|---|---|---|---|---|
| Resin D | 100 | 100 | 100 | 100 | 100 |
| Initiator B | 1.84 | 1.72 | 1.56 | 1.81 | 1.54 |
| Inhibitor | 0.46 | 0.43 | 0.39 | 0.45 | 0.39 |
| Release Agent | 5.52 | 5.15 | 4.69 | 5.44 | 4.62 |
| Graphite A | 322.14 | 291.85 | 253.91 | 317.17 | 250.29 |
| Modifier B | 30.23 | 30.04 | 30.08 | 28.23 | 28.23 |
| Bulk Conductivity S/cm | 36 | 21.2 | 15 | 39 | 21 |
| Tensile psi | | | | 2312 | 2765 |
| Flexural psi | | | | 6154 | 5994 |
| Density g/cm3 | 1.76 | 1.76 | 1.75 | 1.75 | 1.73 |
| Shrink mils/in | −2 | −2 | −2.33 | −1.67 | −1.83 |

TABLE 4D

| Component | 23468 | 23469 | 23470 | 23471 | 23505 |
|---|---|---|---|---|---|
| Resin D | 100 | 100 | 100 | 100 | 100 |
| Initiator B | 1.69 | 1.75 | 1.95 | 2.11 | 1.48 |
| Inhibitor | 0.42 | 0.44 | 0.49 | 0.53 | 0.37 |
| Release Agent | 5.08 | 5.25 | 5.85 | 6.33 | 4.45 |
| Graphite A | 287.77 | 284.46 | 331.55 | 369.39 | 241.01 |
| Modifier B | 28.23 | 28.23 | 28.23 | 28.23 | 23.47 |
| Fiber D | | 17.51 | 19.50 | 21.11 | |
| Bulk Conductivity S/cm | 34 | | 45 | 60 | 61 |
| Tensile psi | 2466 | 2804 | 1797 | 2010 | 2821 |
| Flexural psi | 5272 | 7390 | 6682 | 4726 | 4898 |
| Density g/cm3 | 1.71 | 1.6 | 1.62 | 1.58 | 1.7 |
| Shrink mils/in | −2.33 | −2 | −1.42 | −1.67 | −2.5 |

TABLE 5A

| Component | 23506 | 23507 | 23508 | 23509 | 23510 |
|---|---|---|---|---|---|
| Resin D | 100 | 100 | 100 | 100 | 100 |
| Initiator B | 1.63 | 1.75 | 1.45 | 1.59 | 1.70 |
| Inhibitor | 0.41 | 0.44 | 0.36 | 0.40 | 0.43 |
| Release Agent | 4.89 | 5.24 | 4.34 | 4.77 | 5.11 |
| Graphite A | 277.10 | 305.41 | 235.17 | 270.38 | 298.00 |
| Modifier B | 23.47 | 23.47 | 20.48 | 20.48 | 20.48 |
| Bulk Conductivity S/cm | 55 | 45 | 52 | 60 | 65 |
| Tensile psi | 2680 | 2645 | | | 2483 |
| Flexural psi | 4556.7 | 5264.4 | | | 4773.67 |
| Density g/cm3 | 1.74 | 1.74 | 1.79 | 1.78 | 1.76 |
| Shrink mils/in | −2.5 | −2.33 | −2.33 | −2.42 | −1.75 |

TABLE 5B

| Component | 23566 | 23567 | 23568 | 23581 | 23582 |
|---|---|---|---|---|---|
| Resin D | 100 | 100 | 100 | 100 | 100 |
| Initiator B | 1.85 | 1.79 | 1.75 | 1.77 | 1.83 |
| Inhibitor | 0.46 | 0.45 | 0.44 | 0.44 | 0.46 |
| Release Agent | 5.54 | 5.38 | 5.26 | 5.30 | 5.50 |
| Graphite A | 346.42 | 336.32 | 328.95 | 313.33 | 329.82 |
| Modifier B | | | | 20.48 | 20.48 |
| Modifier D | 7.62 | 4.48 | 2.19 | | |
| Bulk Conductivity S/cm | | 92 | 94 | | |
| Density g/cm3 | 1.77 | 1.78 | 1.75 | 1.79 | 1.76 |
| Shrink mils/in | −1.67 | −1.25 | −1.25 | −1.67 | −1.58 |

TABLE 5C

| Component | 23583 | 23584 | 23585 | 23592 | 23593 |
|---|---|---|---|---|---|
| Resin D | 100 | 100 | 100 | 100 | 100 |
| Initiator B | 1.90 | 1.98 | 2.07 | 1.88 | 1.97 |
| Inhibitor | 0.48 | 0.50 | 0.52 | 0.47 | 0.49 |
| Release Agent | 5.71 | 5.95 | 6.20 | 5.63 | 5.91 |
| Graphite A | 347.62 | 366.88 | 387.80 | 352.11 | 369.46 |
| Modifier B | 20.48 | 20.48 | 20.48 | | |
| Modifier D | | | | 9.39 | 14.78 |
| Bulk Conductivity S/cm | | | | 88 | 59 |
| Density g/cm3 | 1.78 | 1.75 | 1.71 | 1.71 | 1.71 |
| Shrink mils/in | −1.5 | −1.25 | −1.25 | −1.67 | −1.67 |

TABLE 5D

| Component | 23594 | 23721 | 23722 | 23723 | 23724 |
|---|---|---|---|---|---|
| Resin D | 100 | 100 | 100 | 100 | 100 |
| Initiator B | 2.07 | 2.19 | 2.24 | 1.94 | 2.00 |
| Inhibitor | 0.52 | 0.55 | 0.56 | 0.48 | 0.50 |
| Release Agent | 6.22 | 6.57 | 6.71 | 5.82 | 6.00 |
| Graphite A | 388.6 | 410.51 | 419.23 | 354.03 | 365.18 |
| Modifier B | | 27.53 | 30.24 | 22.70 | 26.56 |
| Modifier D | 20.73 | | | | |
| Bulk Conductivity S/cm | | 86 | 93 | 68 | 65 |
| Density g/cm3 | 1.71 | 1.74 | 1.77 | 1.77 | 1.78 |
| Shrink mils/in | −1.25 | −1.42 | −1.08 | −1.5 | −1.25 |

TABLE 6A

| Component | 23725 | 23726 | 23727 | 23728 | 23729 |
|---|---|---|---|---|---|
| Resin D | 100 | 100 | 100 | 100 | 100 |
| Initiator B | 2.14 | 1.90 | 2.14 | 1.90 | 2.14 |
| Inhibitor | 0.54 | 0.48 | 0.54 | 0.48 | 0.54 |
| Release Agent | 6.43 | 5.71 | 6.43 | 5.71 | 6.43 |
| Graphite D | 402.14 | 347.62 | | | |
| Graphite E | | | 402.14 | 347.62 | |
| Graphite F | | | | | 402.14 |
| Modifier B | 24.93 | 20.48 | 24.93 | 20.48 | 24.93 |
| Bulk | 96 | 75 | 81 | 62 | |

TABLE 6A-continued

| Component | 23725 | 23726 | 23727 | 23728 | 23729 |
|---|---|---|---|---|---|
| Conductivity S/cm | | | | | |
| Density g/cm3 | 1.77 | 1.78 | 1.81 | 1.8 | |
| Shrink mils/in | −1.67 | −2.33 | −0.83 | −1 | |

TABLE 6B

| Component | 23730 | 23731 | 23732 | 23733 | 23734 |
|---|---|---|---|---|---|
| Resin D | 100 | 100 | 100 | 100 | 100 |
| Initiator B | 1.90 | 2.14 | 1.90 | 2.14 | 2.14 |
| Inhibitor | 0.48 | 0.54 | 0.48 | 0.54 | 0.54 |
| Release Agent | 5.71 | 6.43 | 5.71 | 6.43 | 6.43 |
| Graphite A | | | | 249.33 | 249.33 |
| Graphite E | | | | 152.82 | |
| Graphite F | 347.62 | | | | 152.82 |
| Graphite G | | 402.14 | 347.62 | | |
| Modifier B | 20.48 | 24.93 | 20.48 | 24.93 | 24.93 |
| Bulk Conductivity S/cm | | 32 | 30 | 48 | 25 |
| Density g/cm3 | | | | 1.81 | 1.81 |
| Shrink mils/in | | | | −1.33 | −1.83 |

TABLE 6C

| Component | 23735 | 23736 | 23737 | 23738 | 23739 |
|---|---|---|---|---|---|
| Resin D | 100 | 100 | 100 | 100 | 100 |
| Initiator B | 2.14 | 2.14 | 1.90 | 1.90 | 1.90 |
| Inhibitor | 0.54 | 0.54 | 0.48 | 0.48 | 0.48 |
| Release Agent | 6.43 | 6.43 | 5.71 | 5.71 | 5.71 |
| Graphite A | 249.33 | 249.33 | 215.52 | 215.52 | 215.52 |
| Graphite D | | 152.82 | | | |
| Graphite E | | | 132.10 | | |
| Graphite F | 152.82 | | | 132.10 | |
| Graphite G | 152.82 | | | | 132.10 |
| Modifier B | 24.93 | 24.93 | 20.48 | 20.48 | 20.48 |
| Bulk Conductivity S/cm | 38 | 90 | 50 | 26 | 31 |
| Density g/cm3 | 1.79 | 1.67 | 1.79 | 1.8 | 1.8 |
| Shrink mils/in | −2.08 | −1.58 | −1.83 | −2.33 | −2.67 |

TABLE 6D

| Component | 23740 | 23755 | 23756 | 23757 | 23758 |
|---|---|---|---|---|---|
| Resin D | 100 | 100 | 100 | 100 | 100 |
| Initiator B | 1.90 | 2.17 | 2.20 | 1.93 | 1.95 |
| Inhibitor | 0.48 | 0.54 | 0.55 | 0.48 | 0.49 |
| Release Agent | 5.71 | 6.52 | 6.61 | 5.78 | 5.85 |
| Graphite A | 215.52 | 407.61 | 413.22 | 341.81 | 356.10 |
| Graphite D | 132.10 | | | | |
| Modifier B | 20.48 | 23.91 | 22.87 | 19.52 | 18.54 |
| Modifier D | | 2.72 | 5.51 | 2.41 | 4.88 |
| Bulk Conductivity S/cm | 68 | 70 | 97 | 92 | 89 |
| Density g/cm3 | 1.75 | 1.77 | 1.67 | 1.79 | 1.79 |
| Shrink mils/in | −1.83 | −1.83 | −1.83 | −2 | −2.17 |

TABLE 7A

| Component | 23803 | 23804 | 23805 | 23806 | 23830 |
|---|---|---|---|---|---|
| Resin D | 100 | 100 | 100 | 100 | 100 |
| Initiator B | 2.06 | 2.09 | 2.16 | 2.19 | 2.16 |
| Inhibitor | 0.52 | 0.52 | 0.54 | 0.55 | 0.54 |
| Release Agent | 6.19 | 6.27 | 6.49 | 6.58 | 6.49 |
| Graphite A | 376.29 | 381.20 | 394.59 | 405.48 | 394.59 |
| Modifier B | 25.26 | 25.59 | 25.59 | 26.30 | 30.00 |
| Modifier E | 5.15 | 6.53 | 10.81 | 6.85 | 6.76 |
| Bulk Conductivity S/cm | 62 | 83 | 83 | 90 | |
| Density g/cm3 | 1.77 | 1.77 | 1.76 | 1.77 | 1.79 |
| Shrink mils/in | −1.83 | −1.50 | −1.33 | −1.67 | −1.58 |

TABLE 7B

| Component | 23831 | 23832 | 23833 | 23834 | 23835 |
|---|---|---|---|---|---|
| Resin D | 100 | 100 | 100 | 100 | 100 |
| Initiator B | 2.11 | 2.18 | 2.23 | 2.09 | 2.09 |
| Inhibitor | 0.53 | 0.54 | 0.56 | 0.52 | 0.52 |
| Release Agent | 6.33 | 6.54 | 6.69 | 6.27 | 6.27 |
| Graphite A | 385.22 | 397.82 | 406.69 | | |
| Graphite H | | | | 381.20 | |
| Graphite I | | | | | 381.20 |
| Modifier B | 25.59 | 25.61 | 25.63 | 25.59 | 25.59 |
| Modifier E | | 6.81 | 6.96 | 6.53 | 6.53 |
| Density g/cm3 | 1.74 | 1.76 | 1.72 | | |
| Shrink mils/in | −1.42 | −1.33 | −1.25 | | |

TABLE 7C

| Component | 23836 | 23837 | 23838 | 23839 | 23840 |
|---|---|---|---|---|---|
| Resin D | 100 | 100 | 100 | 100 | 100 |
| Initiator B | 2.09 | 2.24 | 2.24 | 2.24 | 2.24 |
| Inhibitor | 0.52 | 0.56 | 0.56 | 0.56 | 0.56 |
| Release Agent | 6.27 | 6.71 | 6.71 | 6.71 | 6.71 |
| Graphite A | | 408.28 | 408.28 | 408.28 | 408.28 |
| Graphite J | 381.20 | | | | |
| Carbon B | | 0.56 | | | |
| Carbon C | | | 0.56 | | |
| Carbon D | | | | 0.56 | |
| Carbon E | | | | | 0.56 |
| Modifier B | 25.59 | 25.56 | 25.56 | 25.56 | 25.56 |
| Modifier E | 6.53 | 6.99 | 6.99 | 6.99 | 6.99 |
| Modifier F | | 8.39 | 8.39 | 8.39 | 8.39 |
| Density g/cm3 | 1.77 | 1.80 | 1.76 | 1.74 | |
| Shrink mils/in | | −1.08 | −0.92 | −1.17 | −1.08 |

TABLE 7D

| Component | 23878 | 23879 | 23880 | 23881 | 23896 |
|---|---|---|---|---|---|
| Resin D | 100 | 100 | 100 | 100 | 100 |
| Initiator B | 2.26 | 2.37 | 2.28 | 2.39 | 1.48 |
| Inhibitor | 0.57 | 0.59 | 0.57 | 0.60 | 0.49 |
| Release Agent | 6.79 | 7.11 | 6.83 | 7.16 | 5.93 |
| Graphite A | 418.55 | 444.31 | 421.41 | 447.49 | 370.74 |
| Modifier B | 25.57 | 25.59 | 25.57 | 25.60 | 5.68 |
| Modifier C | | | | | 9.99 |
| Modifier E | | | 7.12 | 7.46 | |
| Modifier F | 11.88 | 12.44 | 5.69 | 5.97 | |

TABLE 8A

| Component | 23297 | 23301 | 23302 | 23363 | 23422 |
|---|---|---|---|---|---|
| Resin E | 100 | 100 | 100 | 100 | 100 |
| Initiator B | 1.56 | 1.38 | 1.33 | 1.06 | 1.75 |
| Inhibitor | 0.52 | 0.46 | 0.44 | 0.35 | 0.58 |
| Release Agent | 6.24 | 5.50 | 5.31 | 4.24 | 7.00 |
| Graphite A | 395.22 | 343.88 | 331.86 | 240.03 | 466.74 |
| Modifier B | 5.98 | 2.66 | 1.28 | 2.65 | 2.68 |
| Modifier C | 10.50 | 4.63 | 2.26 | 4.66 | 4.67 |
| Bulk Conductivity S/cm | | 72.5 | | 35 | |
| Density g/cm3 | | 1.62 | | 1.53 | 1.6 |
| Shrink mils/in | | −2.33 | | −1.33 | −0.92 |

TABLE 8B

| Component | 23423 | 23452 | 23453 | 23454 | 23455 |
|---|---|---|---|---|---|
| Resin D | | 50.03 | 60.00 | 70.03 | 80.00 |
| Resin E | 100 | | | | |
| Resin F | | 49.97 | 40.00 | 29.97 | 20.00 |
| Initiator B | 2.40 | 2.14 | 2.14 | 2.14 | 2.14 |
| Inhibitor | 0.80 | 0.54 | 0.54 | 0.54 | 0.54 |
| Release Agent | 9.61 | 6.43 | 6.43 | 6.43 | 6.43 |
| Graphite A | 680.54 | 402.14 | 402.14 | 402.14 | 402.14 |
| Modifier B | 2.64 | 24.93 | 24.93 | 24.93 | 24.93 |
| Modifier C | 4.64 | | | | |
| Bulk Conductivity S/cm | | 63 | 70.5 | 70 | 83.5 |
| Tensile psi | | 2441 | 2497 | 2404 | 2561 |
| Flexural psi | | 5030 | 5126 | 4284 | 5391 |
| Density g/cm3 | 1.47 | 1.71 | 1.74 | 1.75 | 1.66 |
| Shrink mils/in | −0.25 | −1.17 | −1.58 | −1.67 | −1.42 |

TABLE 8C

| Component | 23530 | 23531 | 23646 | 23647 | 23648 |
|---|---|---|---|---|---|
| Resin F | 100 | 100 | | | |
| Resin G | | | 100 | 100 | 100 |
| Initiator B | 1.85 | 1.79 | 1.81 | 1.91 | 2.02 |
| Inhibitor | 0.46 | 0.45 | 0.45 | 0.48 | 0.50 |
| Release Agent | 5.54 | 5.38 | 5.42 | 5.72 | 6.06 |
| Graphite A | 346.42 | 336.32 | 338.75 | 357.65 | 378.60 |
| Modifier B | | 5.24 | | 11.11 | 17.62 |
| Modifier D | 7.62 | 4.48 | | | |
| Bulk Conductivity S/cm | | | 86 | 58 | 46 |
| Tensile psi | 2305.56 | 2155.56 | | | |
| Flexural psi | 4548.8 | 4421.3 | | | |
| Density g/cm3 | 1.69 | 1.75 | 1.71 | 1.72 | 1.65 |
| Shrink mils/in | −0.42 | −1.67 | −1.58 | −1.42 | −1.33 |

TABLE 8D

| Component | 23649 | 23650 | 23651 | 23688 |
|---|---|---|---|---|
| Resin D | | | | 53.96 |
| Resin I | 100 | 100 | 100 | |
| Resin J | | | | 46.04 |
| Initiator B | 1.75 | 1.77 | 1.79 | |
| Initiator D | | | | 2.08 |
| Inhibitor | 0.44 | 0.44 | 0.45 | 0.52 |
| Release Agent | 5.26 | 5.31 | 5.38 | 6.25 |
| Graphite A | 328.95 | 331.86 | 336.32 | 385.42 |
| Modifier B | | | | 15.63 |
| Modifier D | 2.19 | 3.10 | 4.48 | |
| Modifier F | | | | 10.94 |
| Bulk Conductivity S/cm | 93 | 79 | 64 | |
| Density g/cm3 | 1.77 | 1.74 | 1.73 | |
| Shrink mils/in | −1.5 | −1.08 | −1.5 | |

While in accordance with the Patent Statutes, the best mode and preferred embodiment have been set forth, the scope of the invention is not limited thereto, but rather by the scope of the attached claims.

What is claimed is:

1. A composition comprising
   a) an unsaturated prepolymer resin which comprises one or more of unsaturated polyester and vinyl ester resin;
   b) an unsaturated material copolymerizable with said resin and including a terminal ethylene group;
   c) at least 50% by total weight of the composition comprising an conductive filler;
   d) an initiator to initiate said copolymerization; and
   e) an effective amount of a rheological modifier to prevent phase separation between said resin and said conductive filler during molding, said rheological modifier being one or more compositions selected from the group consisting of Group II oxides and hydroxides, carbodiamides, aziridines, polyisocyanates, polytetrafluorethylene, perfluoropolyether, polyethylene and fumed silica, and clays.

2. A composition as set forth in claim 1 wherein the effective amount of said rheological modifier is from about 0.5% to about 15% by total weight of the system.

3. A composition as set forth in claim 2 wherein the conductive filler is a particulate or flake filler and the amount of said conductive filler is at least 60 weight percent.

4. A composition as set forth in claim 3 wherein the conductive filler is a graphite filler and the amount of said conductive filler is at least 65 weight percent.

5. A composition as set forth in claim 1, wherein said rheological modifier comprises magnesium oxide and/or calcium oxide and said effective amount is from about 0.1 to about 2 weight percent based on the weight of said composition.

6. A composition as set forth in claim 1, wherein said rheological modifier is one or more of aziridine, carbodiamide, and polyisocyanate and said effective amount is from about 1 to about 10 weight percent based on the weight of said composition.

7. A composition as set forth in claim 1, wherein said effective amount of rheological modifier is an effective amount to prevent cracking of a part molded at a pressure from about 400 to about 2000 psi and to a thickness of from about 0.050 to about 0.200 inches.

8. A composition as set forth in claim 1, wherein said modifier comprises one or more of polytetraflyoroethylene, perfluoropolyether and said effective amount is from about 0.1 to about 5 weight percent based on the weight of said molding composition.

9. A composition as set forth in claim 1, wherein said rheological modifier is polyisocyanate and said effective amount is from about 2 to about 8 weight percent based on the weight of said molding composition.

10. A composition as set forth in claim 4 wherein said conductive filler is a synthetic crystalline graphite particle and said unsaturated prepolymer resin is one or more resins selected from the group consisting of epoxy vinyl resin, bisphenol fumarate resin, modified bisphenol fumarate polyester resin, unsaturated polyester resin, urethane-modified vinyl ester resin, bisphenol-epoxy vinylester resin, elastomer-modified vinyl ester resin, epoxy novolac vinyl ester resin and unsaturated isocyanurate vinyl ester resin.

11. A composition as set forth in claim 10 wherein said copolymerizable material is one or more monomers selected from the group consisting of styrene, alpha-methyl styrene, chloro-styrene, vinyl toluene, divinyl benzene, diallylphthalate, and methyl methacrylate, and mixture thereof.

12. A composition as set forth in claim 11 wherein said copolymerizable material is one or more monomers selected from the group consisting of styrene and methyl methacrylate.

13. A composition as set forth in claim 12 wherein said initiator is a free radical initiator.

14. A composition as set forth in claim 13 wherein said initiator is selected from the group consisting of peroxides, hydroperoxides, redox systems, diazo compounds, persulfates, and perbenzoates, and is used in amounts of about 0.05 to about 5 weight percent based on the total weight of the system.

15. A composition as set forth in claim 14 further comprising carbon black.

16. A composition as set forth in claim 14 further comprising reinforcing fillers.

17. An electrochemical cell flow field plate comprising a molded thermosetting resin composition having a thickness from about 0.050 to about 0.200 inches and a bulk conductivity of at least 55 S/cm, said molded resin composition being the reaction product of at least:
   a) an unsaturated prepolymer resin which comprises one or more of unsaturated polyester and vinyl ester resin;
   b) an unsaturated material copolymerizable with said resin and including a terminal ethylene group;
   c) at least 50% by total weight of the composition comprising an conductive filler;
   d) an initiator to initiate said copolymerization; and
   e) an effective amount of a Theological modifier to prevent phase separation between said resin and said conductive filler during molding, said rheological modifier being one or more compositions selected from the group consisting of Group II oxides and hydroxides, carbodiamides, aziridines, polyisocyanates, polytetrafluorethylene, perfluoropolyether, polyethylene, clays and fumed silica.

18. An electrochemical cell flow field plate as set forth in claim 17 wherein the effective amount of said rheological modifier is from about 0.5% to about 15% by total weight of the system.

19. An electrochemical cell flow field plate as set forth in claim 18 wherein the conductive filler is a particulate filler and the amount of said conductive filler is at least 60 weight percent.

20. An electrochemical cell flow field plate as set forth in claim 19 wherein the filler is a graphite filler and the amount of said conductive filler is at least 65 weight percent.

21. An electrochemical cell flow field plate as set forth in claim 17, wherein said Theological modifier comprises magnesium oxide and/or calcium oxide and said effective amount is from about 0.1 to about 2 weight percent based on the weight of said composition.

22. An electrochemical cell flow field plate as set forth in claim 17, wherein said rheological modifier is one or more of aziridine and polyisocyanate and said effective amount is from about 1 to about 10 weight percent based on the weight of said composition.

23. An electrochemical cell flow field plate as set forth in claim 17, wherein said effective amount of rheological modifier is an effective amount to prevent cracking of a part molded at a pressure from about 400 to about 5000 psi and to a thickness of from about 0.050 to about 0.200 inches.

24. An electrochemical cell flow field plate as set forth in claim 17, wherein said modifier comprises one or more of polytetrafluorethylene, perfluoropolyether and said effective amount is from about 0.1 to about 5 weight percent based on the weight of said molding composition.

25. An electrochemical cell flow field plate as set forth in claim 17, wherein said rheological modifier is polyisocyanate and said effective amount is from about 2 to about 8 weight percent based on the weight of said molding composition.

26. An electrochemical cell flow field plate as set forth in claim 20 wherein said conductive filler is a synthetic crystalline graphite particle and said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, urethane-modified vinyl ester resin, bisphenol-epoxy vinylester resin, elastomer-modified vinyl ester resin, epoxy novolac vinyl ester resin and unsaturated isocyanurate vinyl ester resin.

27. An electrochemical cell flow field plate as set forth in claim 26 wherein said copolymerizable material is one or more monomers selected from the group consisting of styrene, alpha-methyl styrene, chloro-styrene, vinyl toluene, divinyl benzene, diallylphthalate, and methyl methacrylate, and mixtures thereof.

28. An electrochemical cell flow field plate as set forth in claim 27 wherein said copolymerizable material is one or more monomers selected from the group consisting of styrene and methyl methacrylate.

29. An electrochemical cell flow field plate as set forth in claim 28 wherein said initiator is a free radical initiator.

30. An electrochemical cell flow field plate as set forth in claim 29 wherein said initiator is selected from the group consisting of peroxides, hydroperoxides, redox systems, diazo compounds, persulfates, and perbenzoates, and is used in amounts of about 0.05 to about 5 weight percent based on the total weight of the system.

31. An electrochemical cell flow field plate as set forth in claim 30 further comprising carbon black.

32. An electrochemical cell flow field plate as set forth in claim 30 further comprising reinforcing fillers.

33. A conductive molding composition comprising:
   a) 100 parts of an unsaturated prepolymer resin which comprises one or more of unsaturated polyester and vinyl ester resin;
   b) an unsaturated monomer selected from the group consisting of styrene, alpha-methyl styrene, chlorostyrene, vinyl toluene, divinyl benzene, diallylphthalate, and methyl methacrylate, and mixture thereof; wherein the ratio of monomers to unsaturated prepolymer resin is from about 40:60 to about 72:25 by weight of the a and b,
   c) at least about 225 phr of an conductive filler such that a molded product made from said composition has a bulk conductivity of at least about 55 S/cm when measured in accordance with ASTM Test No. F1529-97;
   d) from about 0.5 to about 4.0 phr of an initiator to initiate said copolymerization; and
   e) from about 0.5 to about 20 phr of a rheological modifier which is one or more compositions selected from the group consisting of Group II oxides and hydroxides, carbodiamides, aziridines, polyisocyanates, polytetrafluoroethylene, perfluoropolyether, polyethylene, clay and fumed silica and mixtures thereof.

34. A conductive molding composition as set forth in claim 33 wherein said prepolymer resin is selected from the group consisting of epoxy vinyl resin, bisphenol fumarate resin, modified bisphenol fumarate polyester resin, unsaturated polyester resin, urethane modified vinyl ester resin, urethane-modified vinyl ester resin, bisphenol-epoxy vinylester resin, elastomer-modified vinyl ester resin, epoxy novolac vinyl ester resin and unsaturated isocyanurate vinyl ester resin.

35. A conductive molding composition as set forth in claim 34 wherein the conductive filler is a particulate or flake filler and the amount of said conductive filler is at least 250 phr.

36. A conductive molding composition as set forth in claim 35 wherein the conductive filler is a graphite filler and the amount of said conductive filler is at least 275 phr.

37. A conductive molding composition as set forth in claim 33, wherein said rheological modifier comprises magnesium oxide and/or calcium oxide and said effective amount is from about 0.5 to about 20 phr.

38. A conductive molding composition as set forth in claim 33, wherein said rheological modifier is one or more of aziridine, carbodiamide and polyisocyanate and said effective amount is from about 0.5 to about 20 phr.

39. A conductive molding composition as set forth in claim 33, wherein said modifier comprises one or more of polytetrafluoroethylene, perfluoropolyether and said effective amount is from about 0.5 to about 20 phr.

40. A conductive molding composition as set forth in claim 33, wherein said rheological modifier is polyisocyanate and said effective amount is from about 0.5 to about 20 phr.

41. A conductive molding composition as set forth in claim 33 wherein said copolymerizable material is one or more monomers selected from the group consisting of styrene and methyl methacrylate.

42. A conductive molding composition as set forth in claim 33 wherein said initiator is selected from the group consisting of peroxides, hydroperoxides, redox systems, diazo compounds, persulfates, and perbenzoates, and is used in amounts of about 0.05 to about 20 phr.

43. A conductive molding composition as set forth in claim 42 further comprising carbon black.

44. A conductive molding composition in claim 43 further comprising reinforcing fillers.

45. A molded conductive article comprising the cured reaction product of:
   a) 100 parts of an unsaturated prepolymer resin which comprises one or more of unsaturated polyester and vinyl ester resin;
   b) an unsaturated monomer selected from the group consisting of styrene, alpha-methyl styrene, chlorostyrene, vinyl toluene, divinyl benzene. diallylphthalate, and methyl methacrylate, and mixture thereof;, wherein the ratio of monomers to unsaturated prepolymer resin is from about 40:60 to about 72:25 by weight of the two components,
   c) at least about 225 phr of a conductive filler such that said composition has a bulk conductivity of at least about 55 S/cm when measured in accordance with ASTM Test No. Fl 529-97;
   d) from about 0.5 to about 4.0 phr of an initiator to initiate said copolymerization; and
   e) from about 0.5 to about 20 phr of a rheological modifier which is one or more compositions selected from the group consisting of Group II oxides and hydroxides, carbodiamides, aziridines, polyisocyanates, polytetrafluoroethylene, perfluoropolyether, polyethylene, clay and fumed silica and mixtures thereof.

46. A molded conductive article as set forth in claim 45 wherein said initiator is selected from the group consisting of peroxides, hydroperoxides, redox systems, diazo compounds, persulfates, and perbenzoates, and is used in amounts of about 0.5 to about 4 phr.

47. A molded conductive article as set forth in claim 46 further comprising carbon black.

48. A molded conductive article in claim 46 further comprising reinforcing fillers.

49. A molded conductive product as set forth in claim 45 wherein said unsaturated prepolymer resin is one or more resins selected from the group consisting of epoxy vinyl resin, bisphenol fumarate resin, modified bisphenol fumarate polyester resin, unsaturated polyester resin, urethane modified vinyl ester resin, urethane-modified vinyl ester resin, bisphenol-epoxy vinylester resin, elastomer-modified vinyl ester resin, epoxy novolac vinyl ester resin and unsaturated isocyanurate vinyl ester resin.

50. A method of molding highly loaded polymer which is the reaction product of a composition comprising:
   a) an unsaturated prepolymer resin which comprises one or more of unsaturated polyester and vinyl ester resin;
   b) an unsaturated material monomer copolymerizable with said resin and including a terminal ethylene group;
   c) at least 50% by total weight of the composition comprising a conductive filler;
   d) an initiator to initiate said copolymerization; said method comprising the addition prior to curing of a rheological agent selected from the group comprising Group II oxides and hydroxides; carbodiamides; aziridines; polyisocyanates; polytetrafluooethylene (PTFE); perfluoropolyether (PFPE), polyethylene, clay, and fumed silica; and subsequently molding said composition under heat and pressure to iniate cure and form said article.

51. A method as set forth in claim 50 wherein said molding is either compression molding or injection molding.

\* \* \* \* \*

UNITED STATES PATENT AND TRADEMARK OFFICE
CERTIFICATE OF CORRECTION

PATENT NO.    : 6,251,308 B1
DATED         : June 26, 2001
INVENTOR(S)   : Kurt I. Butler It is certified that error appears in the above-identified patent and that said Letters Patent is hereby corrected as shown below:

Column 3,
Line 49, replace "FIG. 1" with -- FIG. 2 --.
Line 51, replace "FIG. 2" with -- FIG. 1 --.

Column 7,
Line 44, replace "12" with -- 32 --.
Line 45, replace "14" with -- 34 --.
Line 46, replace "16" with -- 36 --.
Line 46, replace "20" with -- 40 --.
Line 47, replace "22" with -- 42 --.
Line 48, replace "24" with -- 44 --.
Line 48, replace "26" with -- 38 --.

Signed and Sealed this

Thirty-first Day of December, 2002

JAMES E. ROGAN
*Director of the United States Patent and Trademark Office*